United States Patent [19]
Pittner et al.

[11] Patent Number: 4,900,336
[45] Date of Patent: Feb. 13, 1990

[54] METHOD OF PREFERENTIALLY REMOVING OXYGEN FROM OZONATED WATER

[75] Inventors: Gregory A. Pittner, Yorba Linda, Calif.; Larry L. Crabtree, Lincolnshire, Ill.

[73] Assignee: Arrowhead Industrial Water, Inc., Lincolnshire, Ill.

[21] Appl. No.: 332,161

[22] Filed: Apr. 3, 1989

[51] Int. Cl.[4] ............................................. B01D 19/00
[52] U.S. Cl. ............................................. 55/55; 55/68
[58] Field of Search .................... 55/36, 40, 41, 55, 68

[56] References Cited

U.S. PATENT DOCUMENTS

| | | |
|---|---|---|
| 2,704,274 | 3/1955 | Allison ................................. 204/176 |
| 2,975,035 | 3/1961 | Cook ..................................... 23/222 |
| 3,230,045 | 1/1966 | Miller ..................................... 23/221 |
| 4,183,728 | 1/1980 | Leitzke et al. ...................... 23/232 E |
| 4,259,299 | 3/1981 | Hagiwara et al. .................. 423/210 |
| 4,407,665 | 10/1983 | Lasater ..................................... 55/55 |
| 4,421,533 | 12/1983 | Nishino et al. ......................... 55/68 |
| 4,565,634 | 1/1986 | Lydersen ............................. 210/718 |
| 4,749,640 | 6/1988 | Tremont ............................. 430/314 |

*Primary Examiner*—Bernard Nozick
*Attorney, Agent, or Firm*—Gerstman & Ellis

[57] ABSTRACT

Ozonated water may desirably have the concentration of oxygen present reduced by agitating the water at less than atmospheric pressure to remove dissolved gases. Substantially more oxygen may be removed from the water than ozone by this technique, to provide a product water which has advantages of use in electronic manufacturing operations.

15 Claims, 1 Drawing Sheet

METHOD OF PREFERENTIALLY REMOVING OXYGEN FROM OZONATED WATER

BACKGROUND OF THE INVENTION

In Tremont et al. U.S. Pat. No. 4,749,640, an integrated circuit manufacturing process is disclosed in which ozonated water, containing preferably between 0.02 and 0.09 p.p.m. ozone, is used a part of the manufacturing process. The ozone in the water is a powerful oxidizing agent, for use in conditioning electronic components such as uncovered portions of a photoresist, to provide a beneficial, thin oxide film thereon.

In the prior methods for manufacturing ozonated water used for such purposes, the oxygen content of the water is typically greatly higher than the ozone content. Water initially tends to contain dissolved oxygen and no ozone. Then, pure oxygen gas may be fed through a conventional ozone generator to produce oxygen plus ozone. The resulting oxygen-ozone mixture includes oxygen typically present in a concentration of about 90 percent or more, and ozone present at a concentration of typically less than 10 percent. This mixture may be fed to a compressor, where the gas mixture is compressed to 85 psi, for example, and injected into water through a gas injector.

Thus, by such a process or other typical prior art processes, the oxygen concentration is much greater than the ozone concentration in ozonated water.

It is believed that high oxygen concentrations in ozonated water may interfere with the controlled oxidation of a surface by the ozone present. Thus, it is desirable in at least some circumstances to use ozonated water of lower oxygen content to produce the desired controlled oxidation in electronic components.

It turns out to be difficult to obtain ozonated water with an oxygen content which is reduced to a concentration comparable with the ozone present. Ozone generators generally fail to provide ozone-oxygen mixtures where the two components are in comparable concentrations. Even if they did, such a mixture could be dangerously explosive, and thus undesirable for industrial use because of the potential dangers of the direct addition to water of ozone-oxygen mixtures with an ozone concentration on the order of 50 percent.

Alternatively, while those skilled in the art might address various chemical means for removing oxygen from water, it is not seen how one could effectively and inexpensively remove oxygen from the water without also removing the ozone present, probably at a rate greater than the oxygen removal rate.

In accordance with this invention, a method is provided for preferentially removing oxygen from water which contains a mixture of oxygen and ozone. This method is believed to be the first feasible method for obtaining ozonated water which has a relatively low oxygen content comparable with the ozone content. Such ozonated water is believed to be usable in electronic manufacturing processes to provide thin, high density, adherent oxide films on silicon and other surfaces, with improved results when compared with ozonated water having higher oxygen contents.

DESCRIPTION OF THE INVENTION

In this invention, oxygen is removed preferentially from water which contains a mixture of oxygen and ozone. The method comprises agitating the ozonated water while the water is exposed to a gas phase at less than atmospheric pressure, to remove dissolved gases from the water. Surprisingly, substantially more oxygen (on the order of 10 times more) is removed from the water than ozone, especially when the pressure is low enough to cause the water to boil. While not wishing to be limited to a theory of operation of the application of this invention, it is believed that the oxygen present is removed at a rate on the order of 10 times faster than the ozone removal under conditions of agitation (preferably boiling) at less than atmospheric pressure because ozone is 10 to 15 times more soluble than oxygen in water, and thus binds to the water molecules with greater strength. As a result of this, it becomes possible to preferentially remove oxygen from water, to significantly increase the relative concentration of ozone in the water, compared with the oxygen concentration.

Preferably, the water may be agitated under a sufficiently reduced pressure and for a time sufficient to cause the oxygen content by weight in the water to drop to essentially no more than the ozone content by weight in the water. The water may preferably be agitated by falling through cascade means for providing turbulent, high surface area contact with the gas phase or space at less than atmospheric pressure. This may be accomplished in a commercially available vacuum degasifier, for example, typically comprising a vacuum vessel with cascade means comprising Raschig rings or Intalox saddles, to provide a structure through which the water can cascade with high contact with a gas phase, which is held by a vacuum pump at significantly reduced pressure.

It is generally preferred for the water, after oxygen removal, to contain from 10 to 100 parts per billion by weight (p.p.b.) of ozone, the water preferably also containing, after oxygen removal, no more than about 50 p.p.b. of oxygen and preferably in a concentration no more that substantially equal to the ozone concentration. The feed water which is processed in accordance with this invention may be pretreated by conventional ozonation so that, immediately before the oxygen removal step, the water contains no more than about 10 parts by weight of oxygen per one part by weight of ozone present. For example, commercial ozone generators sold by Griffin Technics or Brown Boveri are available, to produce a feed water in which the ozone concentration is about 20 percent the concentration of oxygen in the water. Other commercial ozone generators produce lower concentrations of ozone in water relative to the oxygen present. It is generally desirable for the ozone concentration in the feed water to be as high as practically possible relative to the oxygen concentration. Preferably, a combined, ozone-oxygen content of the water after oxygen removal is about 80 to 120 p.p.b.

The less than atmospheric pressure that is used to process water in accordance with this invention is generally low enough to cause the water to boil at its processing temperature. For example, at a 10 degree C. water temperature, the maximum preferred pressure would be about 9.2 mm. Hg..

DESCRIPTION OF SPECIFIC EMBODIMENT

Figure 1:
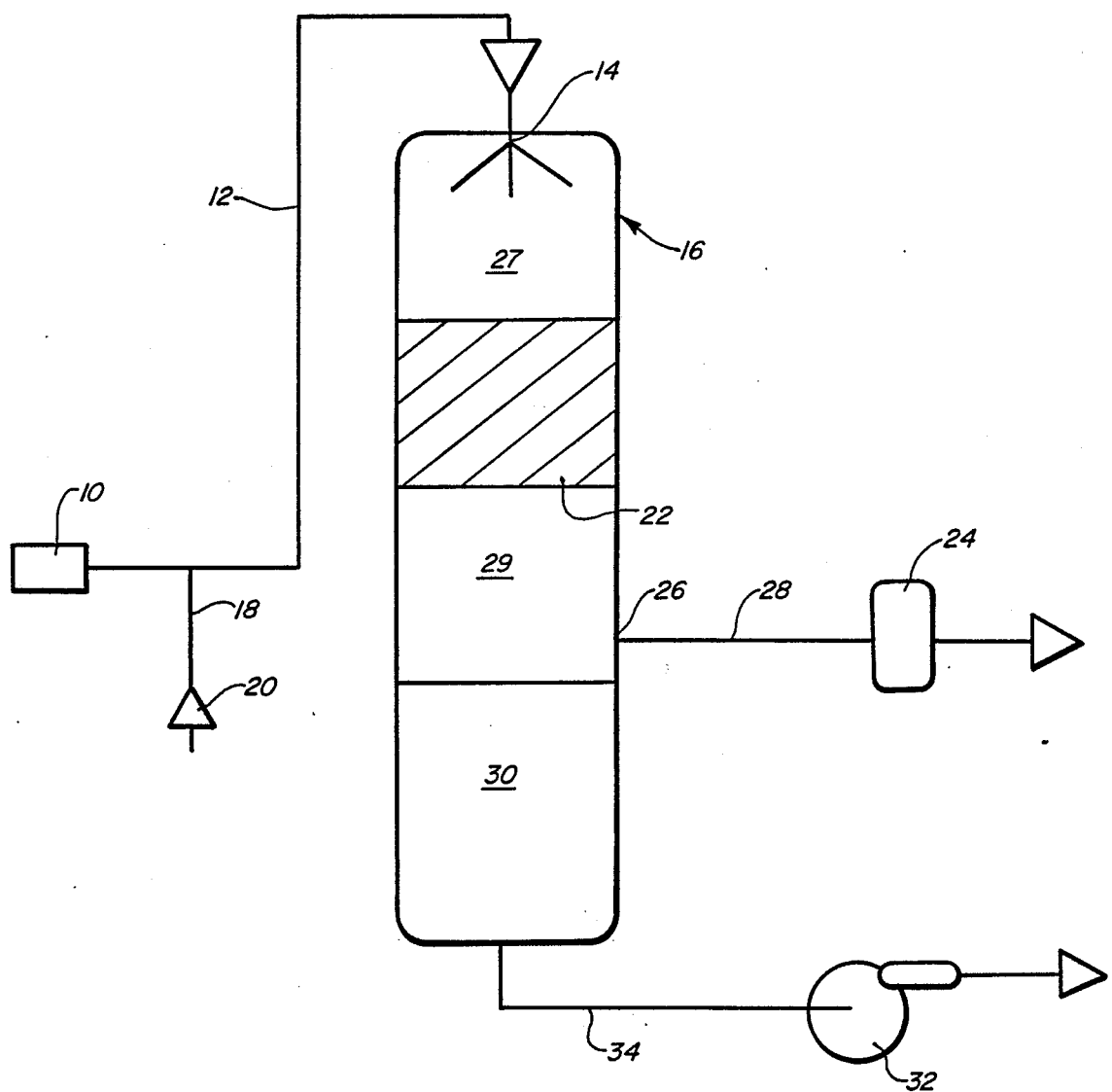
FIG. 1 is a schematic view of a process for preferentially removing oxygen from ozonated water in accordance with this invention.

Referring to FIG. 1, a water feed source 10 is provided for providing deionized water to inlet line 12, which communicates with a spray inlet head 14 at the top of vacuum degasifier column 16.

Inlet line 12 communicates with branch line 18. Ozone generator 20 is provided, being preferably a Griffin Technics or Brown Boveri ozone generator capable of providing from a pure oxygen feed a high concentration product containing about 1 part of ozone per 5 parts of oxygen by weight. This ozone-oxygen mixture passes through branch line 18 to commingle with the water passing through inlet line 12.

The water from source 10 will initially have approximately 100 p.p.b. of oxygen, by way of example. The ozone-oxygen mixture may be provided through line 18 to provide the water with a final concentration of approximately 600 p.p.b. of oxygen and approximately 100 p.p.b. of ozone. The water at this concentration then passes through spray head 14, to be sprayed upon packing 22 which provides cascading agitation to the water, being an open, flow-permeable structure made with an assembly, for example, of the previously mentioned Raschig rings or Intalox saddles, to provide the desired intimate contact between the gas phase atmosphere inside of column 16 and drops of falling water from spray head 14. Simultaneously, vacuum pump 24 is providing a constantly reduced pressure to cause water boiling in the column 16, to withdraw water vapor and gases that are generated from the water by packing section 22. If desired, a porous hydrophobic filter 26 may be provided to prevent the inflow of water into vacuum line 28, thus to only permit the withdrawal of water vapor and gases from column 16.

Areas 27 and 29 represent open space through which the water falls. The water drops that fall through packing layer 22 are collected in a bulk storage zone 30 at the bottom of column 16, and constitute water having a substantially decreased oxygen content relative to its ozone content, so that, preferably, the ozone content of the product water 30 is on the order of 50 p.p.b. and the oxygen content thereof is on the order of 40 p.p.b..

The product water 30 may be removed by a conventional centrifugal pump 32 through line 34 for its desired use.

By this invention, an improved washing water is provided for electronic manufacturing processes, in which a relatively high ozone content and a relatively low oxygen content is provided, to achieve the advantages described above. At desired reduced pressures, the water may be treated by fall through agitation zone and empty spaces 27, 29 in a preferred process embodiment that is almost instantaneous, requiring about 1 to 5 seconds for treatment.

The above has been offered for illustrative purposes only, and is not intended to limit the scope of the invention of this application, which is as defined in the claims below.

That which is claimed is:

1. The method of preferentially removing oxygen from water which contains a mixture of oxygen and ozone as dissolved gases, which method comprises agitating said water while exposed to a gas phase at less than atmospheric pressure, to remove the dissolved gases from the water, whereby substantially more oxygen is removed from the water than ozone.

2. The method of claim 1 in which said water is agitated under a sufficiently reduced pressure and for a time sufficient to cause the oxygen content by weight in the water to drop to essentially no more than the ozone content by weight in the water.

3. The method of claim 1 in which said water is agitated by falling through cascade means while boiling, for providing turbulent, high surface area contact with said open space at less than atmospheric pressure.

4. The method of claim 1 in which, immediately before oxygen removal, said water contains no more than about ten parts by weight of oxygen per one part by weight of ozone present.

5. The method of claim 1 in which said less than atmospheric pressure is low enough to permit the water to boil.

6. The method of claim 1 in which the combined ozone-oxygen content of the water after oxygen removal is about 80-120 p.p.b..

7. The method of claim 1 in which said water, after oxygen removal, contains about 10 to 100 p.p.b. of ozone.

8. The method of claim 4 in which said water, after oxygen removal, contains no more than about 50 p.p.b. of oxygen.

9. A deoxygenation method including the steps of intimately mixing with water a mixture comprising ozone and oxygen as dissolved gases, whereby the resulting product water contains no more than about 10 parts by weight of oxygen per 1 part by weight of ozone present, at least 10 p.p.b. ozone being present, and thereafter agitating said product water in contact with a gas phase at less than atmospheric pressure to remove the dissolved gases from the water by boiling, whereby substantially more oxygen is removed from the water than ozone.

10. The method of claim 9 in which said water is agitated under a sufficiently reduced pressure and for a time sufficient to cause the oxygen content by weight in the water to drop to essentially no more than the ozone content by weight in the water.

11. The method of claim 10 in which said water is agitated by falling through cascade means for providing turbulent, high surface area contact with said open space at less than atmospheric pressure.

12. The method of claim 11 in which said water, after oxygen removal, contains no more than about 100 p.p.b. of ozone.

13. The method of claim 12 in which said water, after oxygen removal, contains no more than about 50 p.p.b. of oxygen.

14. The method of claim 13 in which the combined ozone-oxygen content of the water after oxygen removal is about 80-120 p.p.b..

15. The method of claim 14 in which said less than atmospheric pressure is no more than about 9.2 mm. Hg.

* * * * *